(12) United States Patent
Polick (10) Patent No.: US 6,821,182 B2
(45) Date of Patent: Nov. 23, 2004

(54) GEAR-DRIVING DEVICE

(75) Inventor: Peter Polick, New York, NY (US)

(73) Assignee: Innovative USA, Inc., Norwalk, CT (US)

( * ) Notice: Subject to any disclaimer, the term of this patent is extended or adjusted under 35 U.S.C. 154(b) by 175 days.

(21) Appl. No.: 10/195,332

(22) Filed: Jul. 15, 2002

(65) Prior Publication Data

US 2004/0009460 A1 Jan. 15, 2004

(51) Int. Cl.⁷ .............................................. A63H 33/38
(52) U.S. Cl. ...................... 446/103; 446/147; 434/365; 434/401; 281/15.1
(58) Field of Search ................................ 446/147, 148, 446/149, 151, 103; 281/15.1, 28, 38, 51; 434/365, 368, 401

(56) References Cited

U.S. PATENT DOCUMENTS

| | | | |
|---|---|---|---|
| 622,111 A | 3/1899 | Brentano | |
| 2,692,443 A | * 10/1954 | Milligan | ..................... 434/401 |
| 3,193,293 A | 7/1965 | Schaper | |
| 3,417,996 A | 12/1968 | Janiszewski | |
| 3,992,956 A | 11/1976 | Fischer | |
| 4,450,650 A | 5/1984 | Holden et al. | |
| 4,468,033 A | 8/1984 | Minami et al. | |
| 4,537,576 A | 8/1985 | Thorsheim et al. | |
| 4,642,054 A | 2/1987 | Wada | |
| 5,004,442 A | 4/1991 | Lemelson et al. | |
| 5,073,138 A | 12/1991 | Klitsner et al. | |
| 5,139,454 A | 8/1992 | Earnest | |
| D330,052 S | 10/1992 | Klitsner | |
| 5,194,031 A | 3/1993 | Sahler | |
| D388,475 S | 12/1997 | Glickman | |
| D395,469 S | 6/1998 | Glickman | |
| 5,954,518 A | 9/1999 | Teichberg | |
| 5,988,684 A | 11/1999 | Blaustein et al. | |
| 5,999,339 A | 12/1999 | Kam et al. | |
| 6,086,105 A | 7/2000 | Woldenberg et al. | |
| 6,183,332 B1 | 2/2001 | Yamazaki | |
| 6,244,922 B1 | 6/2001 | Kang | |

FOREIGN PATENT DOCUMENTS

GB 637567 5/1950

* cited by examiner

Primary Examiner—Jacob K. Ackun, Jr.
(74) Attorney, Agent, or Firm—Hedman & Costigan,P.C.; Alan B. Clement (57) ABSTRACT

A gear-driving device that allows the user to create an interlocking moving gear display that is coordinated with the subject matter in a book or on a page.

26 Claims, 14 Drawing Sheets

GEAR-DRIVING DEVICE

FIELD OF INVENTION

The present invention relates to a device, such as a book, that is useful in stimulating a child's desire to read and learn. More particularly, the present invention relates to a gear-driving device useful in teaching concepts concerning power transmission through the use of motors and gears. Most particularly, the present invention relates to a gear-driving device that allows the user to create an interlocking moving gear display integrally coordinated with subject matter in a book or on pages.

BACKGROUND OF INVENTION

Devices for stimulating a child's desire to read and learn are well known in the art. Books are especially useful in this regard. The market for children's books is highly competitive. Publishers are constantly developing features for books that they believe children will find appealing. Some of these books use motors and gears to achieve their objectives.

Books of the aforementioned types take many forms. For instance, Kang, U.S. Pat. No. 6,244,922, teaches drive units, including gears, contained in a book-shaped housing that has a plurality of windows. In each window on the front of the book-shaped housing is a movable ornament, linked to the drive unit by a rod protruding through a slot in the housing. When driven by the rod attached to the drive unit, the ornament is able to move along a path dictated by its own particular sliding slot.

Blaustein, U.S. Pat. No. 5,988,684, teaches a book with movable toys, housed in hollows in the inner back cover, driven by a mechanism in the back cover, and visible through appropriately-shaped cut-outs in the back cover and in the book's pages. Thus, the movable toys can be observed in the context of each page.

No prior art, however, teaches or suggests a book integrally equipped with a gear-driving device that allows a user to place a variety of gears on a variety of background pages. Further, no prior art teaches or suggests a device with gears that are separate toys placed into hubs on the pages and rotated when linked to the driving mechanism or gears that may be transferred from place to place on individual pages or from page to page.

In these ways, the present invention is a useful tool both for stimulating a child's desire to read and learn and for hands-on teaching of concepts concerning power transmission through the use of motors and gears.

SUMMARY OF INVENTION

The present invention concerns a device having a gear-driving means that stimulates a child's desire to read and learn and is useful in teaching concepts concerning power transmission through the use of motors and gears.

Thus, it is an object of the present invention to provide a useful book or other device comprising a gear-driving apparatus that will enable the user to experiment with gears associated with words, representations, characters, objects or scenes depicted in a book or on pages.

It is a further object of this invention to provide a book and gear-driving device that will enable the user to create an interlocking moving gear display that coordinates with the subject matter on a particular page of the book.

It is a further object of this invention to allow a user to develop and/or express his/her imagination, creativity and thinking skills.

It is a further object of this invention to provide an outlet for such entertainment that is easy to use and relatively cost-efficient to manufacture.

These and other objectives will become evident to those skilled in the art from the specification. To these ends, one embodiment of the present invention comprises a front cover; a back cover; at least one page between the front and back covers; wherein at least one of the front cover, back cover or page are provided with a gear-driving device.

In certain preferred embodiments, the gear-driving device is provided on the back cover and is comprised of a tray; a mechanical box containing at least one motor (with a battery and compartment therefore, at least one switch and at least one power shaft); compartments for holding one or more gears and/or gear driven members. The compartments are preferably housed in a box with a hinged lid with a flap, which tucks into the edge of the tray to close it or other closing means known to those skilled in the art including, but not limited to, snap, Velcro® or magnetic closures. The lid opens and closes to allow access to the items housed. The lid and the book pages are provided with die-cut openings to enable the power shaft to penetrate the book through all the pages, from back cover to the first page and/or front cover or as many pages as may be desired.

When the book is opened to any page, an appropriate gear may be removed from a compartment and placed on the exposed power shaft. Additionally, the hubs of other gears or stacks of gears may be placed into hub wells cut into each page to create an interlocking moving gear display driven by the power shaft, which relates to the subject matter of the page in use.

BRIEF DESCRIPTION OF THE INVENTION

DETAILED DESCRIPTION OF THE INVENTION

The following description of preferred embodiments is presented to illustrate the present invention and is not to be construed to limit the scope of the appended claims in any manner whatsoever.

Figure 1:
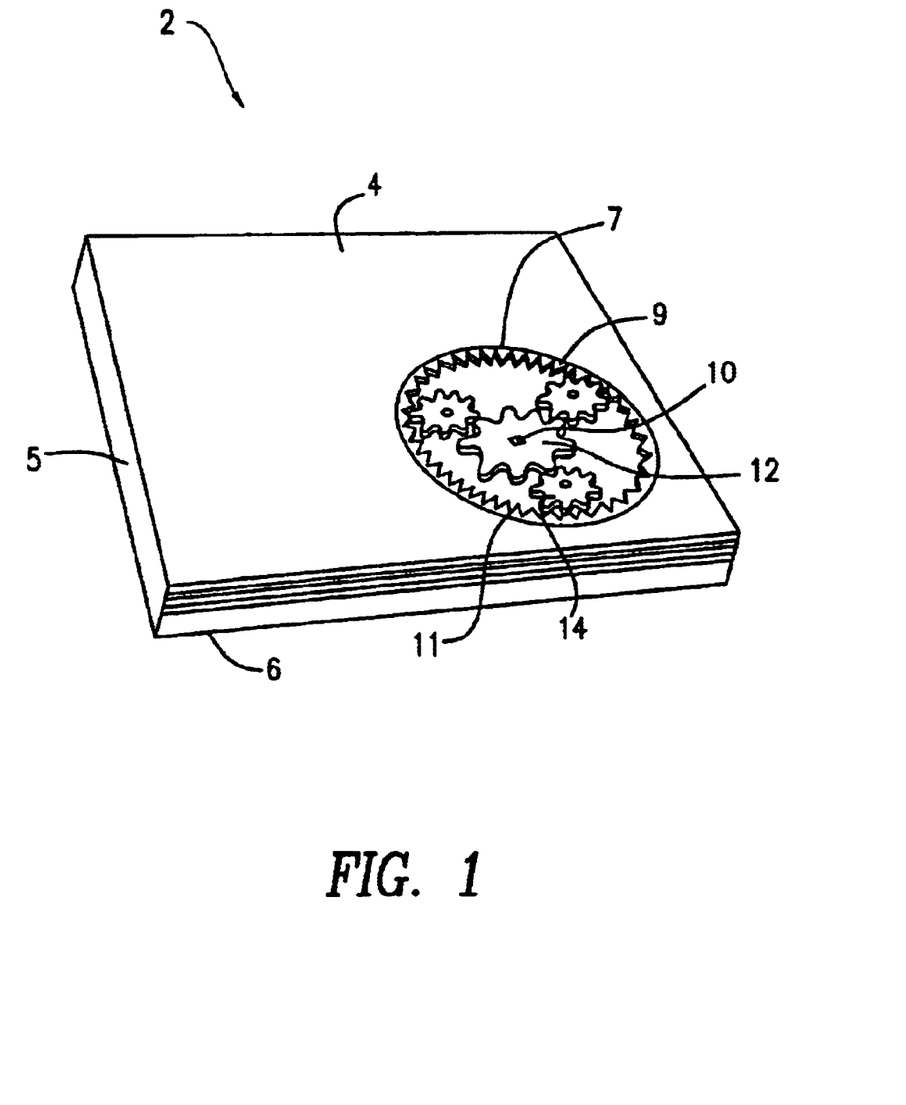
FIG. 1 depicts a top view of a preferred embodiment of a book of the present invention in a closed position.

Referring to FIG. 1, there is shown a top view of one preferred embodiment of the present invention. The book 2 has a front cover 4 bound to a back cover 6 by a binding means 5. Any binding means known in the art may be employed including, but not limited to, adhesive or glue bindings, ring binding, male/female mating type bindings, spiral bindings, stitching, slide-on type clip bindings or other mechanical binding means or the use of one continuous folded piece for the front cover and back holding the pages.

Figure 12:
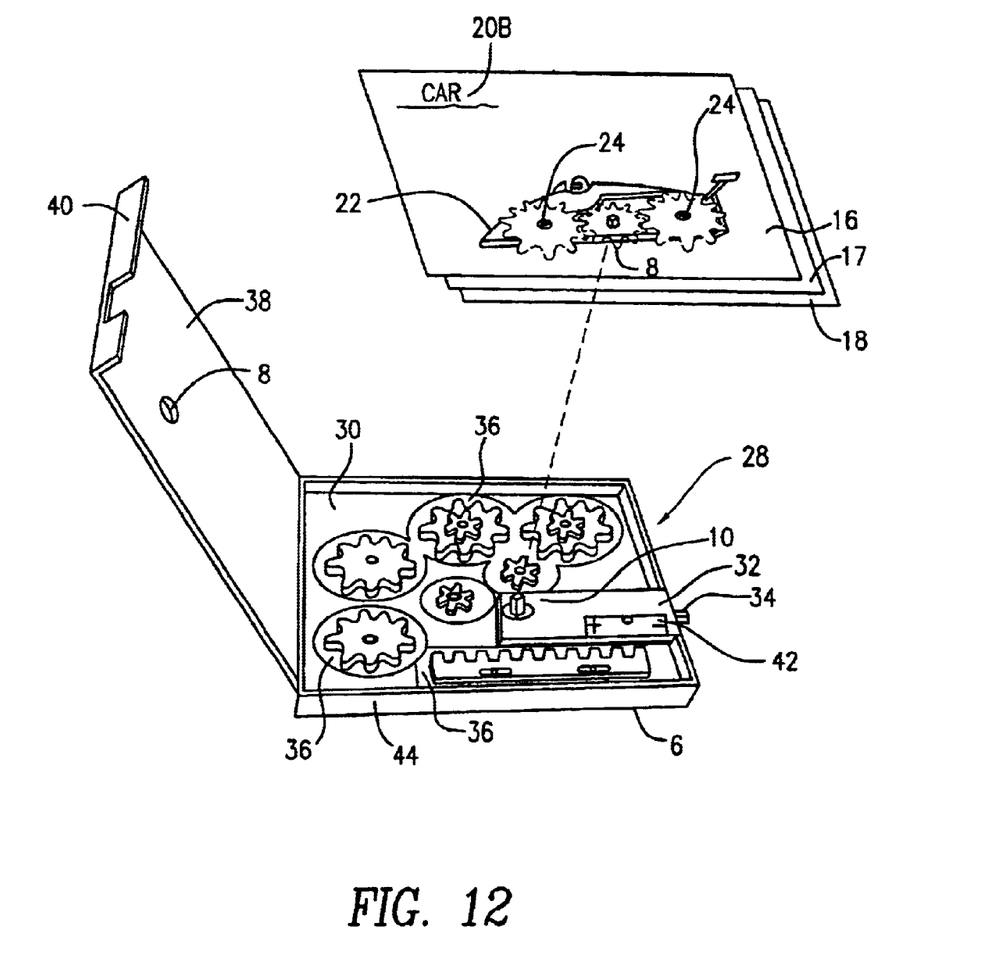
FIGS. 12 through 14 depict other embodiments of the present invention wherein the pages are not bound.
Figure 13:
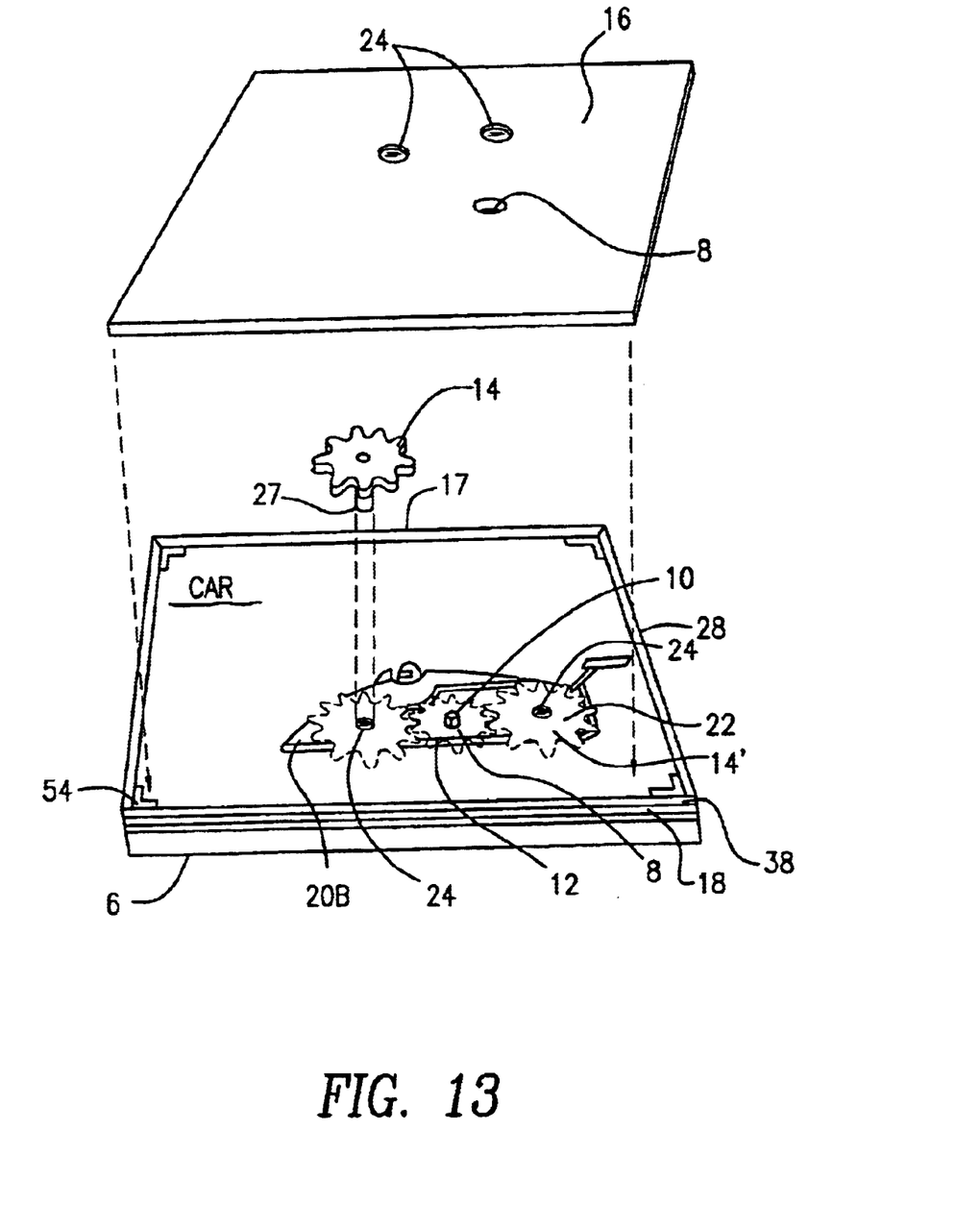
Figure 14:
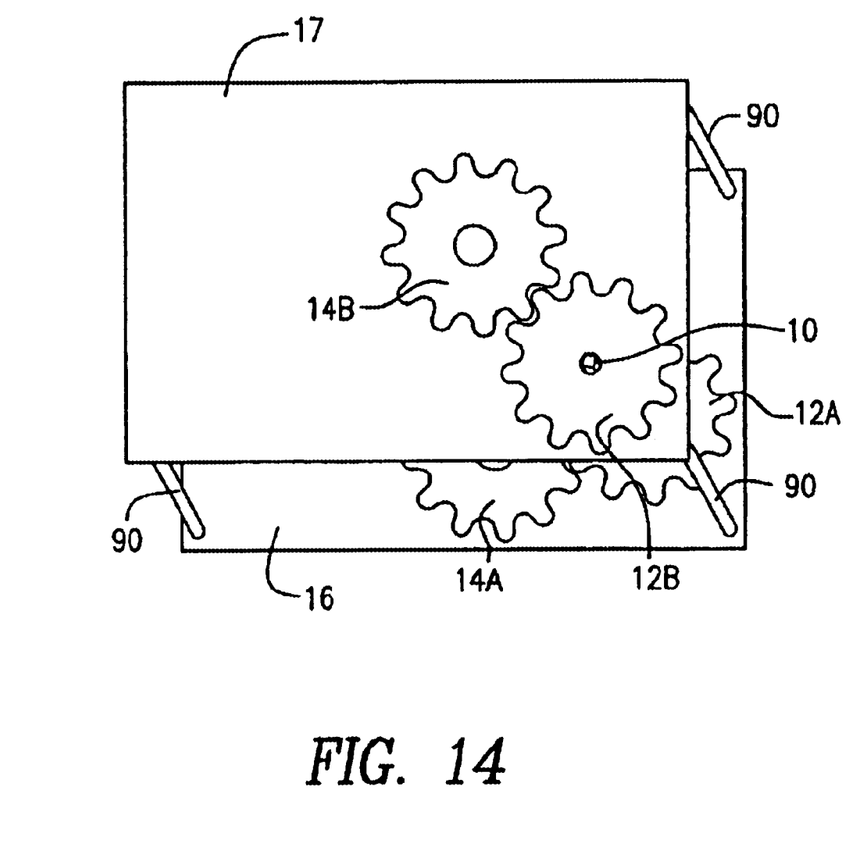

In still other embodiments, the pages need not be bound and may comprise loose pages (or even pages detachable from a binding) that are printed on either or both sides that can be stacked on top of each other and/or removed from the gear-driving device (see FIGS. 12–14).

The front cover 4 and back cover 6 may be constructed of any material known to those skilled in the art that provides sufficient rigidity and printability. These materials may include, but are not limited to, paper, cardboard, textiles and plastics. Preferred is cardboard that is about 1/16 of an inch thick. In the depicted preferred embodiment, the front cover has a die-cut hole 7 that allows the user to view the power shaft 10 of the gear-driving device (see FIG. 3) and examples of power gears 12 and driven gears 14 of the present invention contained within a plastic dome 9 that has teeth 11 on its inside rim that mesh with the teeth of the exemplar driven gears therein. In the depicted embodiment, the user may use the switch (not shown) to activate a motor that rotates the power shaft 10, which, in turn, rotates the exemplar power gear 12, which transmits its rotational force to the exemplar driven gears 14 allowing them to turn within the plastic dome. In other embodiments, the cover need not have such a display or expose the power shaft and/or exemplar gears but could just comprise a solid cardboard cover. The gear-driving device and the operation of the book are further explained below.

Figure 2:
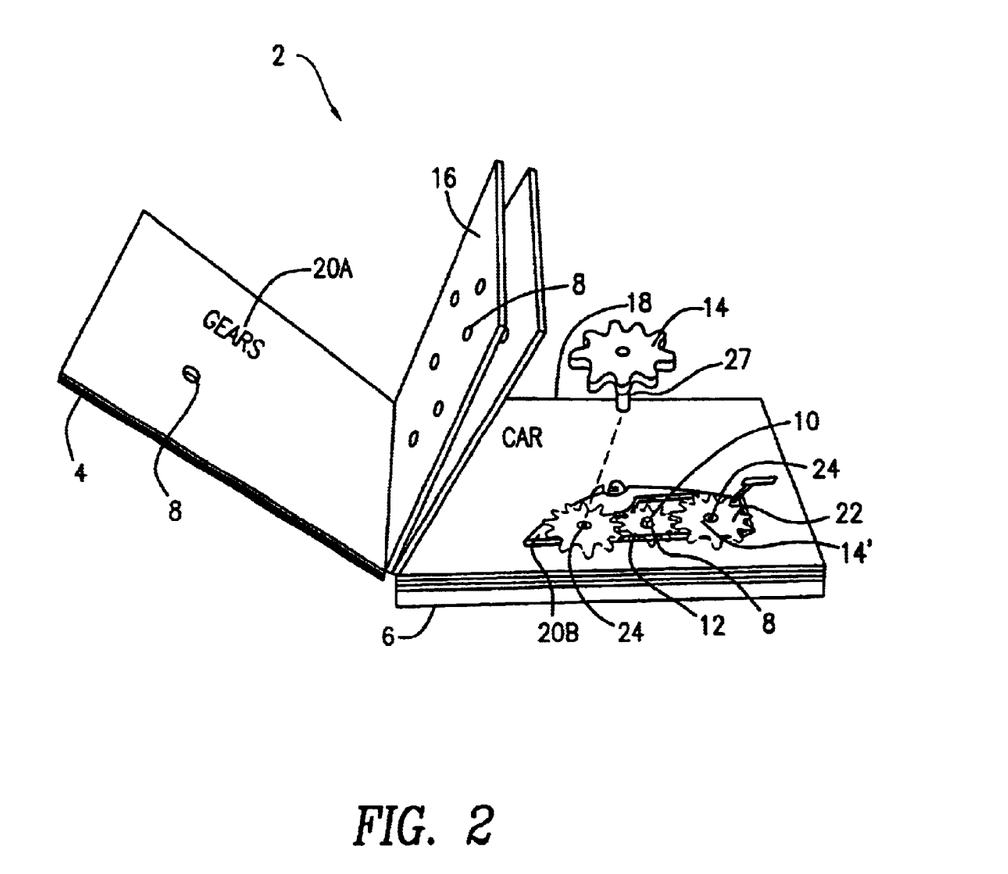
FIG. 2 depicts a top view of a preferred embodiment of a book of the present invention in a partially open position.

Referring to FIG. 2, an opened book 2 can be seen having a front cover 4, a back cover 6 and at least one page 16. Opposing pages show that text or graphics 20A may be located on the left hand page and other words or graphics 20B on the right hand page that relate to a gear-related representation 22 on the right hand page. However, in other embodiments, the text 20A and representations 20B may be on the right hand or left hand page or on both pages. The gear-related representation 22 incorporates the power shaft 10 of the gear-driving device by provision of a die-cut opening 8. The pages 16–18 may be constructed of any material known to those of ordinary skill in the art that provides sufficient rigidity and printability. These materials may include, but are not limited to, paper, cardboard, textiles and plastics.

Figure 3:
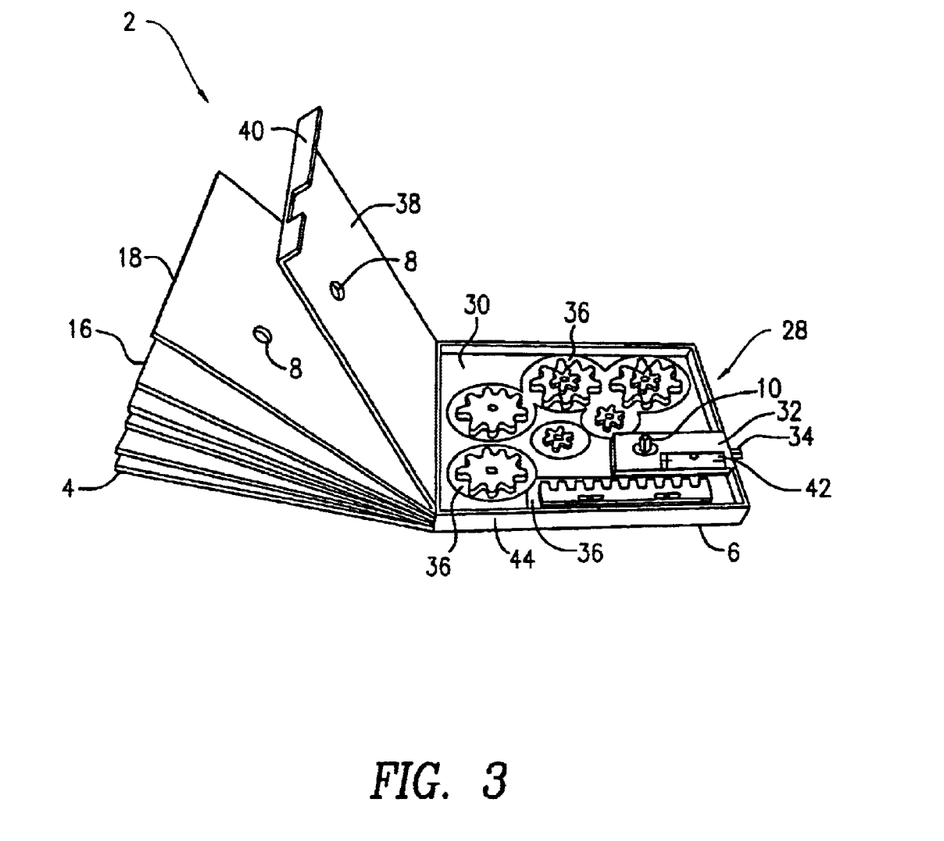
FIG. 3 depicts a top view of an embodiment of the gear-driving device of the present invention.

All of the pages have die-cut openings 8 so that the power shaft penetrates and protrudes through each of the pages. The die-cut openings 8 may be located anywhere on the pages so long as they align with the power shaft 10 of the gear-driving device 28 (FIG. 3). Additionally, it is contemplated within the scope of the present invention that more than one power shaft 10 may be present along with aligning die-cut openings 8. Further, each page may have one or more hub wells 24 formed therein. In some embodiments, the hub wells may pierce the page. However, in other embodiments the hub wells are cut into the page but do not pierce the page. For instance, in some embodiments, the hubs may penetrate half the thickness of the page. The hub wells may be die-cut into each page or be created by any means known to those of ordinary skill in the art. As explained below in connection with the operation of the invention, the hub wells 24 cooperate with the hubs 27 of the driven gears 14 (see FIG. 5A).

Referring now to FIG. 3, there is shown a book 2 of the present invention having a front cover 4 and a plurality of pages 16–18. In the depicted preferred embodiment, the gear-driving device 28 is comprised of a hinged lid 38; a tray 30; and a mechanical box 32. The mechanical box contains a power shaft 10; a motor for rotating said power shaft (not shown); a switch 34; and a battery compartment 42. Any motor known to those skilled in the art for rotatively turning the power shaft, in either one or two directions, may be employed with the present invention. Further, any power source known to those skilled in the art may be used including, but not limited to, wind-up or spring-driving mechanisms or solar powered devices.

The tray 30 contains compartments 36 for holding one or more of the power gears and driven gears. The tray 30 may be constructed of plastic, cardboard or any other material known to those of ordinary skill in the art. In the depicted embodiment, the lid 38 and back cover 6 are separated by a spacer frame 44 to form a housing for the tray 30 and mechanical box 32. A cutout in the spacer frame 44 may be provided to enable access to the switch 34. The lid, back cover and spacer frame are preferably comprised of cardboard or other rigid material similar to that used for the front cover. The spacer frame 44 is preferably part of the back cover such that a box is formed. However, in other embodiments, the spacer frame 44 may be a separate part secured in position by gluing the edges thereof to the edges of the back cover or by any other means known to those of ordinary skill in the art. The mechanical box 32 may also be secured in position such as by gluing it to the inside of the back cover of the book, the inside of the spacer frame, a compartment in the tray or by any other means known to those skilled in the art.

The gear-driving device may be provided with a lid 38 that can open and close with a flap 40 that tucks into the edge of the tray 30. Other means of closing the lid, such as Velcro®, magnetic or snap closures, may also be employed with books of the present invention. The lid and the book pages are provided with die-cut openings 8 to enable the power shaft 10 to penetrate the book through all the pages, from back cover to the first page and/or front cover.

The switch 34 is provided at an outer edge or at another accessible place on the gear-driving device. The switch 34 serves both as a power switch and may, in embodiments where a two directional motor is employed, serve as a changeover switch for changing the rotation of the motor from one direction to the reverse direction and vice-versa. In other embodiments, a second switch may be provided for changing the rotational speed or direction or for operating an additional power shaft.

Figure 4:
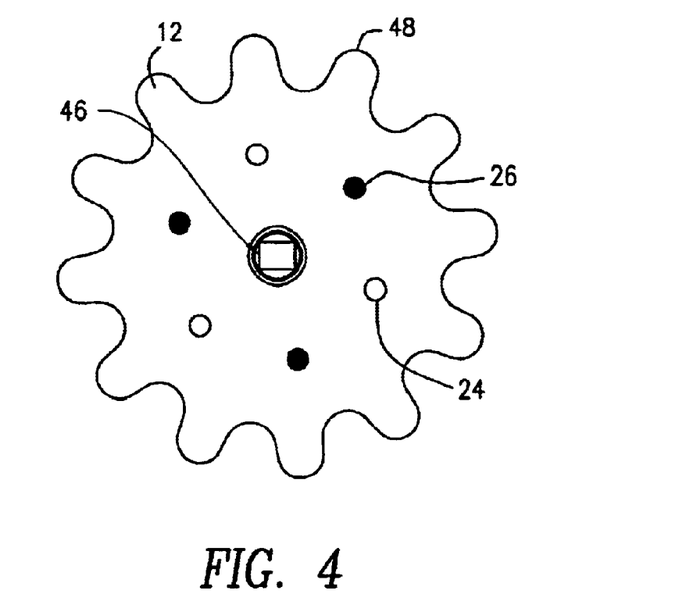
FIGS. 4, 4A and 4B depict an embodiment of the power gears useful in the practice of the present invention.
Figure 4A:
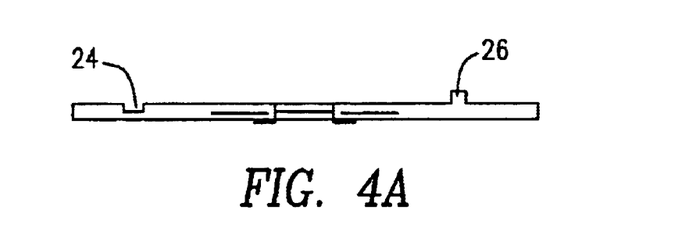

FIG. 4 depicts an embodiment of a power gear 12 for use in accordance with the present invention. The depicted power gear 12 has a central opening 46 shaped to engage with the power shaft 10 (see FIG. 3), such that rotational power of the power shaft is transmitted to the power gear. Other means of attaching the power gear to the power shaft known to those skilled in the art are also within the intended scope of the present invention. In the depicted embodiment of FIG. 4, the opening in the power gear is square shaped to fit over a square shaped power shaft. Other shapes may be used in the practice of the present invention. In embodiments of present invention having more than one power shaft, different shapes may be used for the different power shafts so that power gears for one shaft will not fit over the other shaft(s). Alternatively, the power shafts may be of the same shape and the power gears may be interchangeable. The central opening may be formed in the power gear or may be formed by a separate piece inserted into an opening in the power gear. The power gear may be constructed of plastic or any other material known to those of ordinary skill in the art. In one preferred embodiment, the power gear may be from about one (1) to about four (4) inches in diameter and from about 0.125 to about 0.25 inches in thickness (see side view in FIG. 4A).

Figure 4B:
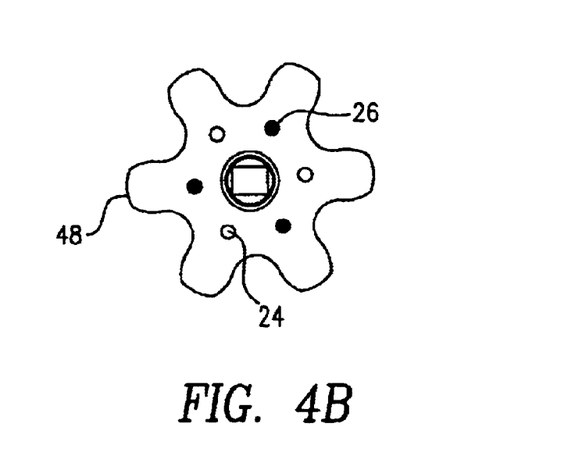

In certain preferred embodiments, at least two power gears of different sizes, one large (see FIG. 4) and one small (see FIG. 4B), are provided. The outer edge of the power gear is provided with an engaging portion that allows it to cooperate with the driven gears. In the depicted embodiment, the engaging portion comprises teeth 48 that mesh with the teeth on the driven gears 50 (see FIG. 5). In other embodiments, the engaging portion may be rubber to facilitate friction, magnetic material or any other method known to those of ordinary skill in the art. In some preferred embodiments, the power gears also have hub wells 24 or hub posts 26 (see FIG. 4) which engage with the hubs 27, hub posts 26 or hub wells 24 of other gears and allow a user to stack gears (see FIG. 8) or other driven members (see FIG. 11).

Figure 5:
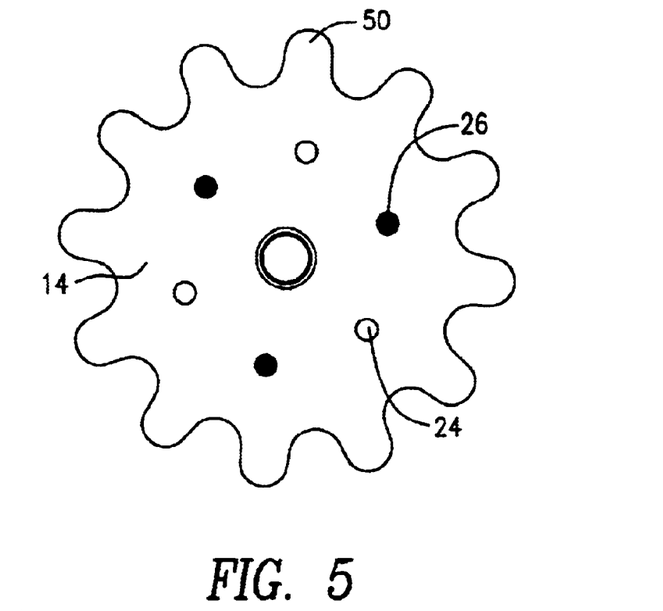
FIGS. 5, 5A and 5B depict an embodiment of the driven gears useful in the practice of the present invention.
Figure 5A:
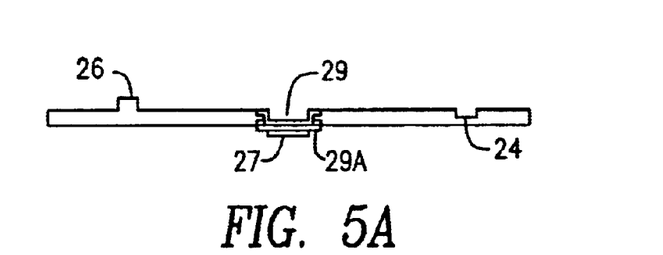
Figure 5B:
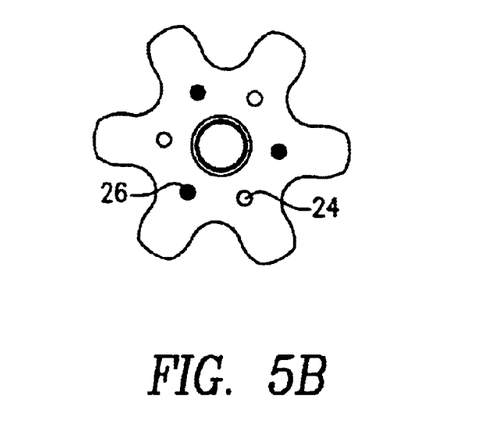

As explained with reference to FIGS. 5 through 8, the driven gears 14 may be of varying shapes and sizes. With reference to FIGS. 5, 5A and 5B, a first example of the driven gear 14 will be explained. The outer edge of the driven gear is provided with an engaging portion that allows it to cooperate with the driven gears. The driven gear 14 according to the first example is provided with teeth 50 which can engage with the teeth 48 of the power gear (or other driven gear). In other embodiments, the engaging portion may be rubber to facilitate friction, magnetic material or any other method known to those of ordinary skill in the art.

In the central part of the lower surface of the driven gear is a hub 27 that extends from the lower surface of the driven gear (FIG. 5A). The reverse side of the hub may have formed within it a hub well 29. The hub 27 may be of unitary construction with the driven gear, or may be a separate piece affixed to the gear, such that the hub 27 turns within the hub well 24 and with the driven gear when in use. However, other means known to those skilled in the art may be employed to this end. In other embodiments, the driven gear may be comprised of a gear that rotates around a hub 27 that remains stationary within the hub well 24 when it is removably attached to the page during use. In one preferred embodiment, the hubs 27 are maintained in position by means of a washer 29A.

Figure 11:
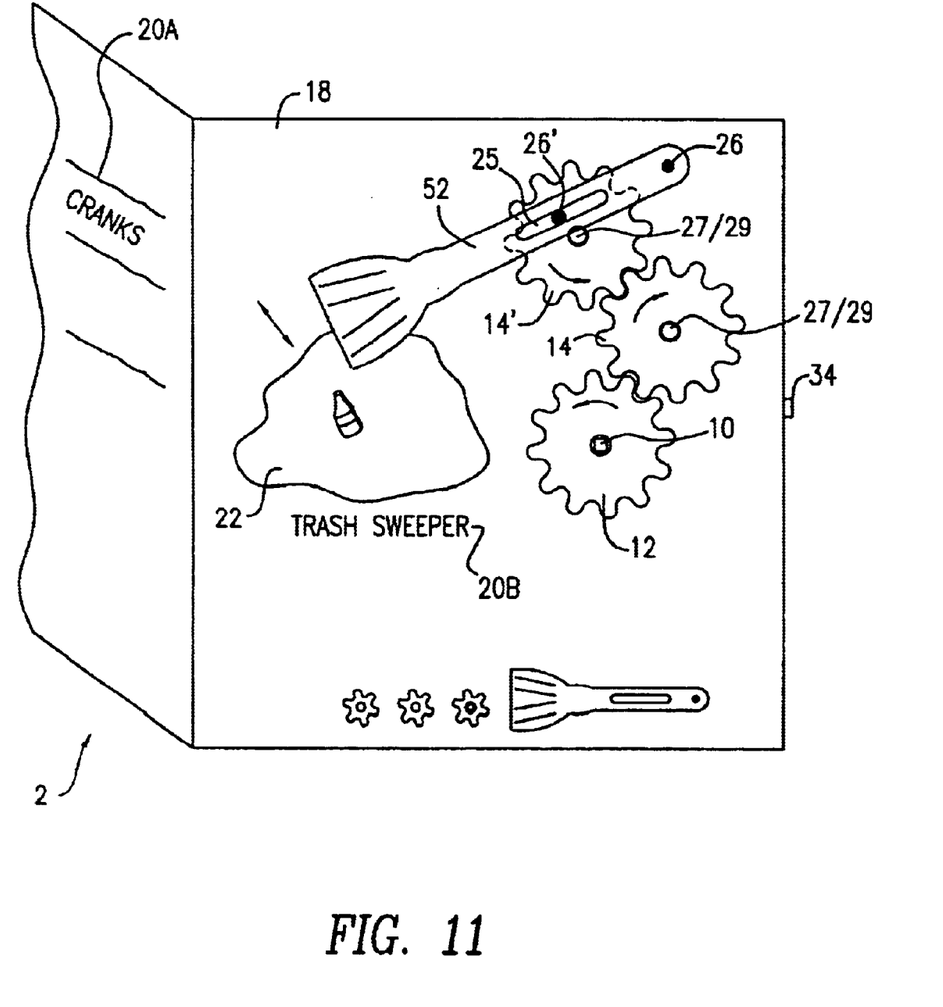

The sides of the driven gears also have hub wells 24 formed therein that engage with the hubs 27 or hub posts 26 of other gears to allow a user to stack gears (see FIG. 8) or engage with other driven members (see FIG. 11). In addition, the driven gears may have hub posts 26 extending from the sides thereof (see FIG. 5A). The hub posts 26 may also engage with the hub wells of other gears and/or the hub wells or holes in the driven members (see FIG. 9). The hubs posts 26 may be of unitary construction with the driven gear, or may be a separate piece affixed to the gear, such that the hub post 26 turns within the hub well 24 and with the driven gear when in use.

In one preferred embodiment, from about one (1) to about five (5) driven gears are provided with the book of the present invention. It is contemplated, however, that any suitable number of driven gears may be provided.

Figure 6:
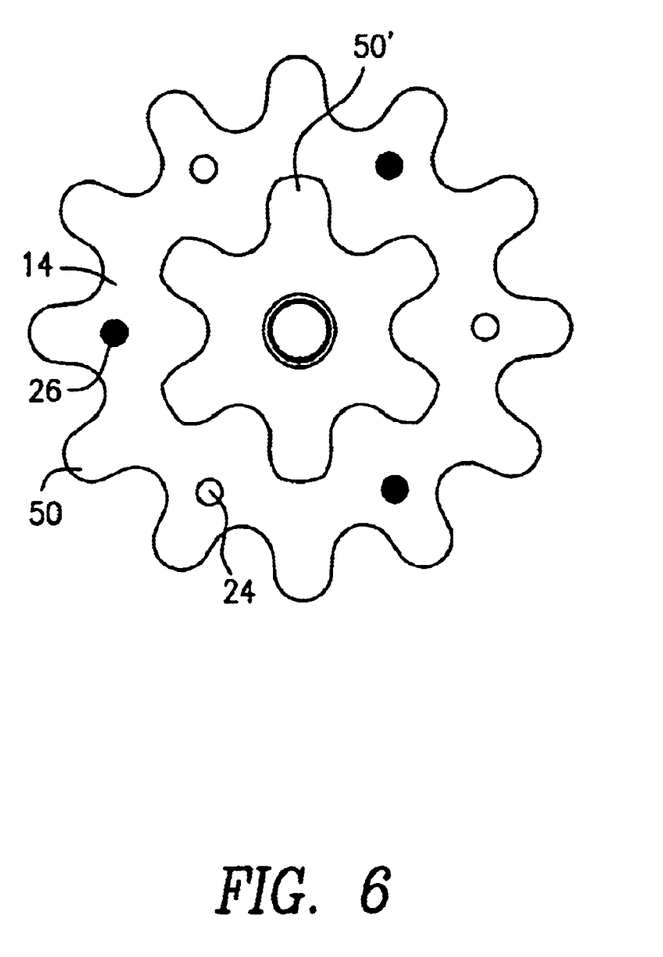
FIGS. 6 and 7 depict other embodiments of the driven gears useful in the practice of the present invention.

Another example of the driven gear 14 will be explained with reference to FIG. 6, which depicts a driven gear 14 with two levels of teeth 50 and 50'. The purpose of the two levels of teeth is to allow the user to create an interlocking gear display that is multi-layered and to provide driven gears that can engage with gears that have been stacked (see FIG. 8).

Figure 7:
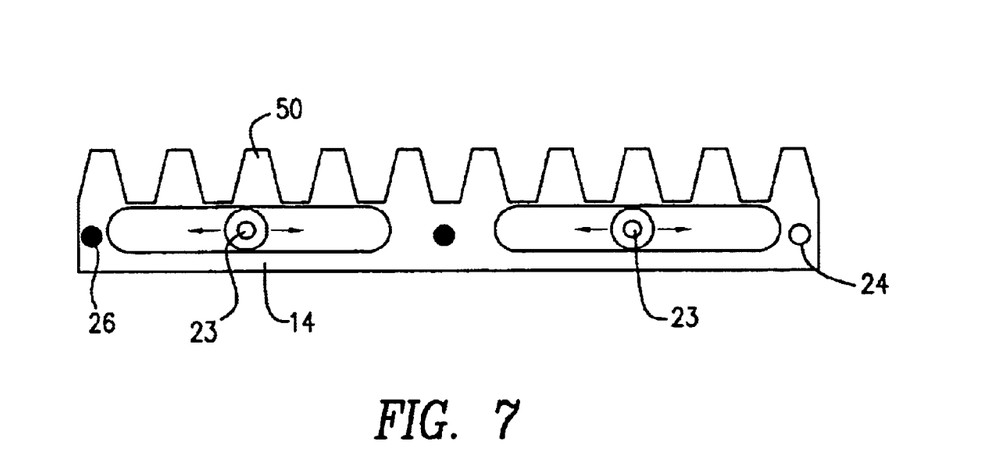
Figure 9:
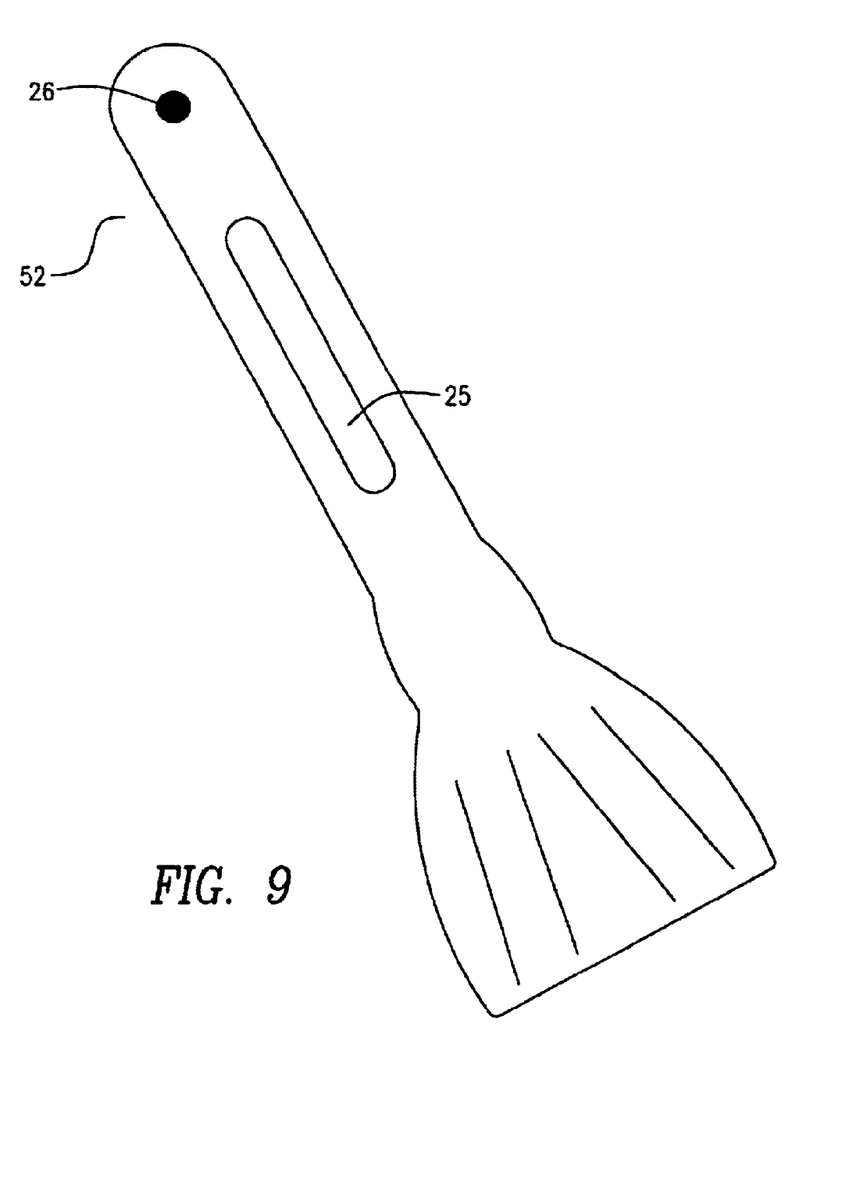
FIG. 9 depicts an embodiment of a driven member useful in the practice of the present invention.

FIG. 7 depicts a rack-type example of a driven gear 14. In one preferred embodiment, the driven gear is about six (6) inches in length, about 1.25 inches in height and about 0.125 to about 0.25 inches thick, although any suitable dimensions may be employed in the practice of the present invention. The gear has teeth 50 that mesh with the teeth of the power gears or other driven gears. In addition, the depicted driven gear has movable hubs 23 that engage with the hub wells 24 on the pages of the book and/or hub wells 24 and 29 on other gears (see FIGS. 4 and 5) or the hub wells or holes on driven members (FIG. 9). These movable hubs are movable within slots 25 cut into the driven gear. The reverse side of said hubs may have a hub well formed therein 29. The rack-type driven gear may also be provided with hub posts 26 and hub wells 24.

Figure 7A:
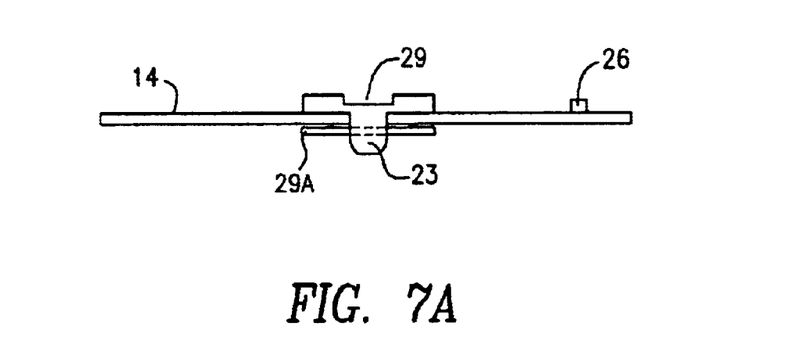

As depicted in FIG. 7A, in one preferred embodiment, the movable hubs 23 are maintained within the slots by means of a washer 29A. However, other means known to those skilled in the art may be employed to this end. In addition, the power gears may have hub posts 26. The hub posts may also engage with the hub wells of other gears and/or the hub wells or holes in the driven members (see FIG. 9).

Figure 8:
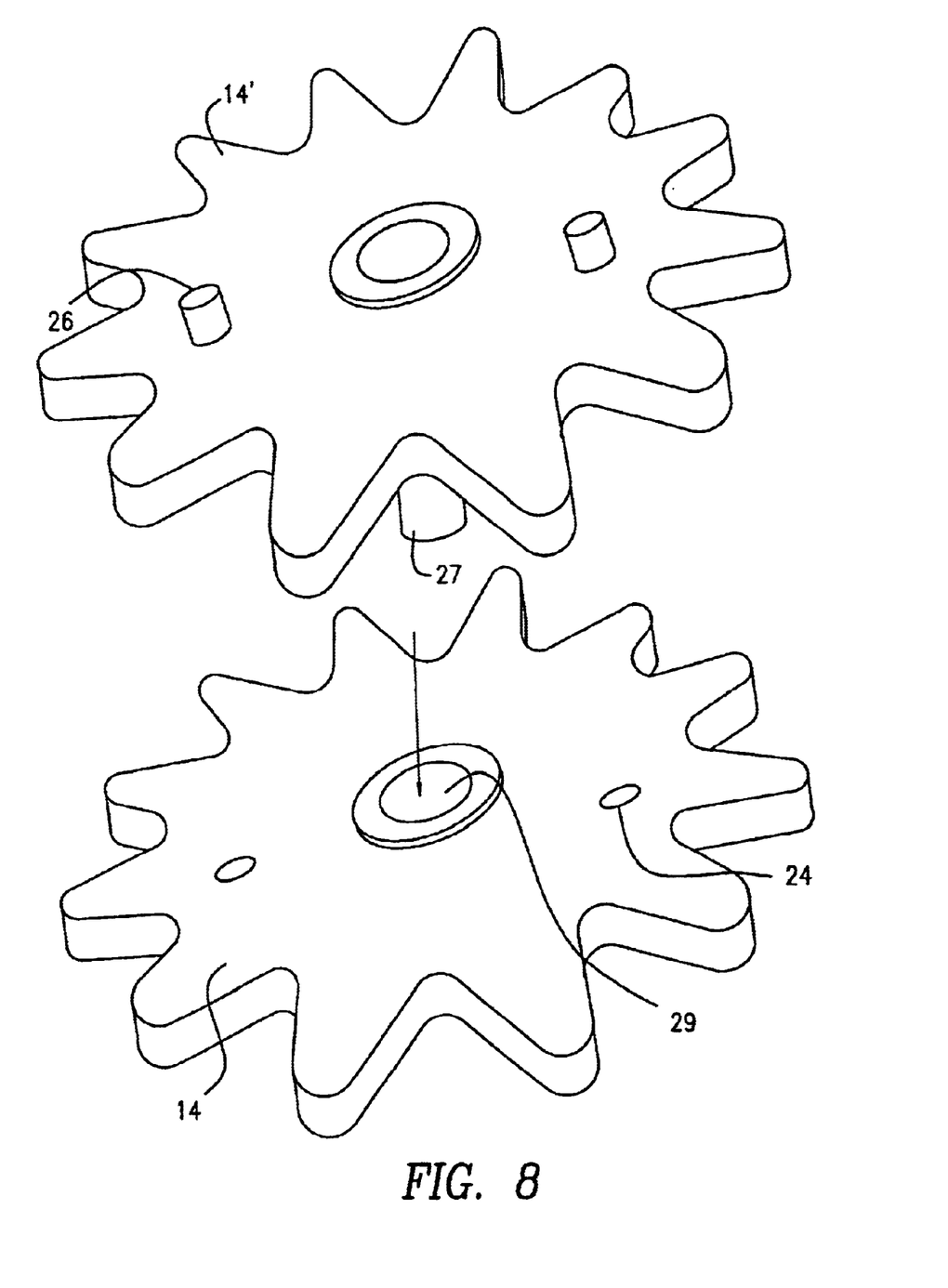
FIG. 8 depicts a method of stacking gears useful in the practice of the present invention.

FIG. 8 depicts a method of stacking gears useful in the practice of the present invention. In FIG. 8, there is shown two driven gears 14 and 14' that are stacked by engaging the hub 27 formed on the lower portion of upper gear 14' with the hub well 29 formed in the upper portion of the lower gear 14. It is also possible to engage the hub 27 formed on the upper gear 14' with the hub well 24 formed on the perimeter of the upper portion of the lower gear 14. Further stacking could also be achieved by engaging the hub post(s) or hub well(s) on the bottom of another driven gear with the hub post(s) or hub well(s) on the top of the depicted upper driven gear 14'.

FIG. 9 depicts an embodiment of the driven member 52 that is useful in the practice of the present invention. Depicted is a driven member in the shape of a broom, however, any other shapes known to those skilled in the art are within the full-intended scope of the invention. The depicted driven member has a hub post 26 that engages with a hub well 24 on a page of the book or a gear (not shown). Further, the depicted embodiment has a slot 25 that engages with hub posts 26 located on the gears. However, in other embodiments, the driven member(s) may have hub posts 26, movable hubs 23 (not shown), hub wells 24 (not shown), or any combination thereof, that allow them to engage the corresponding parts on the pages, power gears, driven gears or other driven members. Further, the driven members 52 may have die-cut holes through them that engage with hubs 27, movable hubs 23 or hub posts 26. In one preferred embodiment, these driven members are constructed of the same material as the power gears 12 or driven gears 14. Further, said driven members may be of any suitable construction and size that allows them to cooperate with the power gears, driven gears, hubs, and/or hub wells.

In order to operate the book depicted, reference is had first to FIG. 2. When the book is opened to any page, an appropriate power gear 12, previously selected from the tray compartment 36 (see FIG. 3), is placed on the exposed power shaft 10. Additionally, the hub 27 of a first driven gear 14 previously selected from the compartment, is placed into designated hub wells 24 cut into the page such that its engaging portion (in this case teeth 50) meshes with the engaging portion (in this case teeth 48) of the power gear to create an interlocking gear display that preferably relates to the subject matter on the particular page. The subject matter of the depicted embodiment concerns motor vehicles. However, there are a myriad of possibilities for the subject matter as will be appreciated by those of ordinary skill in the art.

With further reference to FIG. 2, a second driven gear 14', previously selected from the compartment, may be placed into another hub well in the page such that its engaging portion meshes with the engaging portion of the power gear and/or the engaging portion of the first driven gear. Additional driven gears and/or stacks of gears may also be used. As depicted in FIG. 8, stacking may be achieved by fitting the hubs 27 of the driven gears into hub wells 29 provided on the topside of the power gears or driven gears. (FIG. 6 also depicts an embodiment of a driven gear that allows for stacking of gears.) After the user has positioned the power gear(s) and or driven gear(s) on the page, the user may use the switch 34 to cause the motor to rotate the power shaft 10, which shaft transmits its rotational force to the power gear 12, which, in turn, transmits its rotational force to the driven gears 14. Thus, the user may create an interlocking gear display that preferably coordinates with the subject matter of the page in use. Thereafter, the user may remove the power gears driven gears from the page and select another page and/or other gears.

Figure 10:
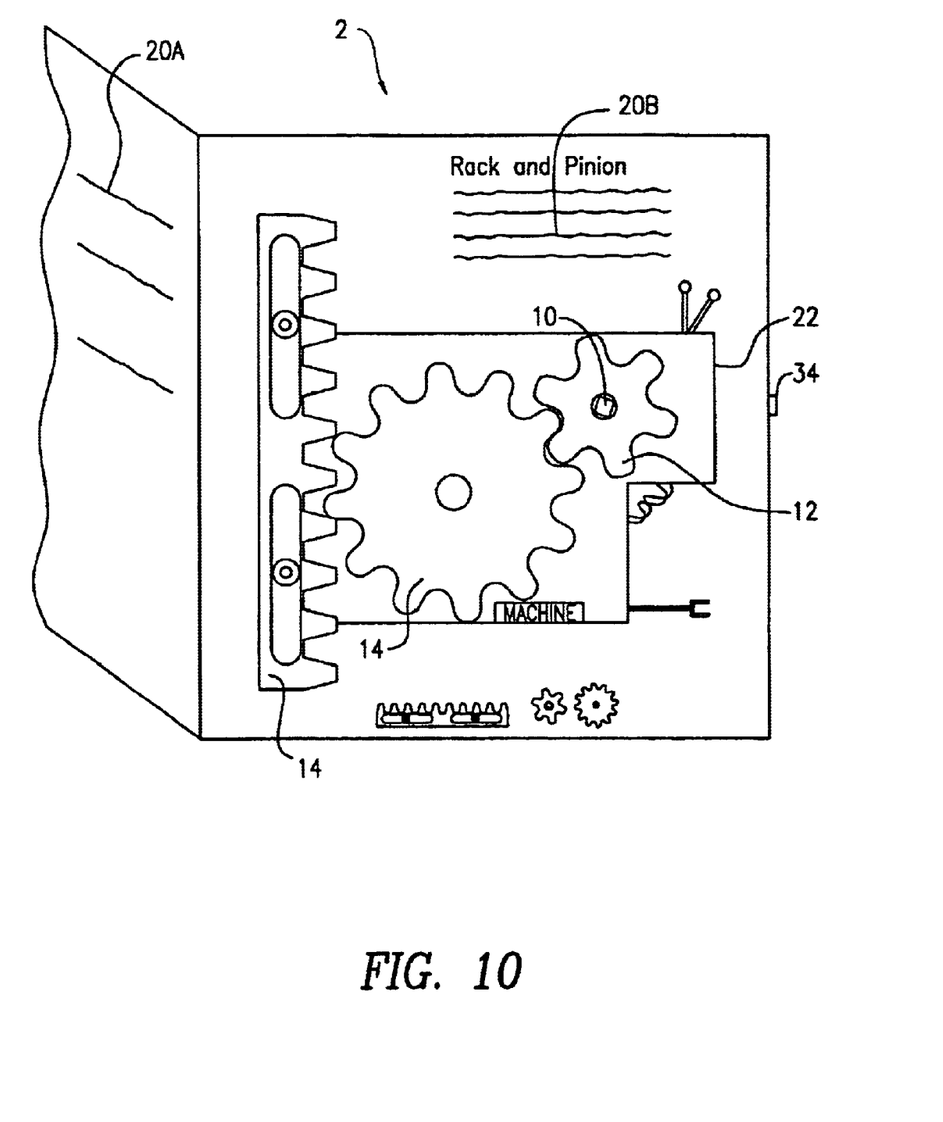
FIGS. 10 and 11 depict illustrative interlocking gear displays useful in the practice of the present invention.

FIGS. 10 and 11 depict illustrative pages 16–18 of a book 2 of the present invention with interlocking gear displays useful in explaining the operation of the book. However, a myriad of other possible pages and subject matter are within the full-intended scope of the present invention and the Figures should not be construed in any way to limit the scope of the claimed invention. FIG. 10 is illustrative of a "rack and pinion" display wherein the rack-type driven gear 14 is made to go up and down rather than to rotate. In other embodiments, the rack-type driven gear may be made to go from side to side. The gear-related representation 22 and text on the right-hand page 20B or the left-hand page 20A are used to enhance the learning experience. When the gears are assembled according to the directions or layout on the page, and the user activates the switch 34, the power shaft 10 is rotated. The rotation of the power shaft 10 is transmitted to the power gear 12, which moves the driven gear 14, which moves the rack-type driven gear up or down, depending on the rotational direction of the power shaft. When the rack-type driven gear is fully extended, the user may reverse the direction of the power shaft 10 using the switch 34, which in turn will lower or raise the rack-type driven member, depending on the rotational direction of the power shaft.

FIG. 11 depicts another illustrative example of a page 18 of the book 2 with an interlocking gear display related to the text 20A and 20B on the subject pages and a gear-related representation 22. The example depicts a power gear 12 on the exposed power shaft 10. Also depicted are interlocking driven gears 14 and 14' attached to the page by means of the hub and hub well system described heretofore. Attached thereto is a driven member 52 of the present invention. The hub post 26 of the driven member 52 is engaged with a hub well (not shown) in the page of the book. The slot 25 of the driven member is engaged with a hub post 26' on the top surface of driven gear 14'. When the gears are assembled according to the layout on the page, and the user activates the switch 34, the power shaft 10 is rotated. The rotation of the power shaft 10 is transmitted to the power gear 12 that rotates the driven gear 14 in contact with it, which rotates the other driven gear 14'. The rotation of the second driven gear 14' causes the driven member 52 to move up and down around the point in the page where its hub post 26 is inserted into the hub well 24 of the page. Hence, a cranking action is achieved and the driven member 52 simulates the sweeping of a broom.

FIG. 12 depicts another preferred embodiment of the present invention wherein the pages 16–18 are not bound together or are detachable from a binding. The gear-driving device 28 depicted is the same as that described with reference to FIG. 3. Again, the device may have compartments 36 for storage of the driven gears 12, power gears 14 and driven members 52. However, the pages 16–18 depicted in FIG. 12 are separate sheets that may be placed over the gear-driving device and the use of die-cut openings 8 allows the power shaft to penetrate or protrude through the pages. The depicted pages are constructed and use a hub and hub well system as explained above in connection with FIG. 2. Further, the pages have hub wells 24 that cooperate with the hubs 27 of the driven gears 14 as explained above in connection with FIG. 5A. In the embodiment depicted in FIGS. 12 and 13, the pages may be such that either side may be placed onto the flat surface that is the top of the lid of the 38 gear-driving device and each side of the page may have different printed matter thereon.

In order to operate the depicted embodiment, reference is had to FIG. 13 wherein it is shown that a page 16 may be selected and placed onto the flat surface of the top of the lid 38 so that the power shaft 10 is exposed through the page, an appropriate power gear 12, previously selected from the tray compartment 36 (see FIG. 12), is placed on the exposed power shaft 10. Additionally, the hub 27 of a first driven gear 14 previously selected from the compartment, is placed into designated hub wells 24 cut into the page such that its engaging portion (in this case teeth 50) (see FIG. 5) meshes with the engaging portion (in this case teeth 48) (see FIG. 4) of the power gear to create an interlocking gear display that preferably relates to the subject matter on the particular page. Again, the subject matter of the depicted embodiment concerns motor vehicles. However, there are a myriad of possibilities for the subject matter as will be appreciated by those of ordinary skill in the art and the present invention contemplates all such variations. The device is then operated in the same manner as described above such that the user may create an interlocking gear display that preferably coordinates with the subject matter of the page in use.

Thereafter, the user may remove the power gears and/or driven gears from the page and select another layout and/or other gears. In selecting another layout, the user may remove the page from the gear-driving device and reverse it, remove the page and replace it with another page, or place another page over the page previously used. In the depicted embodiment, the device may be equipped with one or more holders 54 to assist in keeping the edges of the pages aligned with the edges of the gear-driving device. Such holders may take the form of plastic guides, Velcro®, magnetic or snap fasteners or any other means known to those of skill in art. When the gear-driving device is not in use, the pages may be stored by stacking them on the hinged lid 38. Other means of storing the loose pages are also within the full-intended scope of the present invention including, but not limited to, a storage compartment affixed to the back of the gear-driving device and/or separate and apart from the gear-driving device.

In another embodiment, referring to FIG. 14, the pages 16–18 may be provided with spacers 90, such that the pages may be stacked in a spaced apart fashion. By utilization of a power shaft 10 sufficiently long to be exposed on each page, a three-dimensional gearing display may be effected, with different or related gearings on each of the respective stacked pages. In this manner, power shaft 10 provides rotational power to a first power gear 14A on page 16 and second power gear 14B on page 17. First power gear 12A can then be connected to a first driven gear 14A, and second power gear 12B can be connected to a second drive gear 14B. Of course a wide number of variations on this three dimensional model are envisioned as within the scope of that invention. For example, power shaft 10 could turn only power gear 12A, which in turn could drive driven gear 14A, which may have a connecting shaft on the top of its hub 27 that extends upwards through a hole in page 17 to power a second power gear, which in turn can drive other gears on that page.

All of the above-referenced patents are hereby incorporated by reference. Many variations of the present invention will suggest themselves to those skilled in the art in light of the above-detailed description. All such modifications are within the full-intended scope of the claims.

I claim:

1. A book comprising:
   a front cover;
   a back cover;
   at least one page between said front and back covers;
   said front cover, back cover and at least one page being bound together;
   wherein at least one of said front cover, said back cover or said page are provided with at least one gear-driving device comprising a rotating shaft; and wherein said front cover, said back cover or said page is adapted to provide access to said shaft such that at least one power gear may be engaged with said shaft.

2. A book as defined in claim 1 wherein said gear-driving device is attached to the inside of the back cover.

3. A book as defined in claim 1 wherein said gear-driving device is spring powered.

4. A book as defined in claim 1 wherein said gear-driving device is electrically and/or solar powered.

5. A book as defined in claim 1 wherein said book has from about one to about three power gears.

6. A book as defined in claim 1, further comprising a switch for changing the rotational direction of the power shaft by movement thereof.

7. A book as defined in claim 6, further comprising a second switch for changing a rotational speed of the power shaft by movement thereof.

8. A book as defined in claim 1 further comprising at least one driven gear that can be held at a position on a page of the book and can engage with the power gear or another driven gear while being held on the page, the driven gear having an engaging portion that takes action according to the rotation of the power gear or other driven gear.

9. A book as defined in claim 8 further comprising at least one driven member that engages with a power gear or driven gear and takes action according to the rotation of the power gear or driven gear.

10. A book as defined in claim 8 wherein said book has from about one to about six driven gears.

11. A book as defined in claim 8 wherein means for holding the driven gear on the page is a hub that engages with a hub well on the page.

12. A book as defined in claim 8 wherein said engaging portion of said driven gear are teeth that interact with teeth on said power gear.

13. A book as defined in claim 9 wherein said book has from about one to about six driven members.

14. A book as defined in claim 9 wherein said driven member engages with a driven gear or power gear by means of a hub and hub well.

15. A book as defined in claim 9 wherein said driven gear comprises a gear that rotates around a hub wherein said hub interlocks with a hub well formed in one of a different driven gear, a page, a power gear, or a driven member.

16. A book as defined in claim 15 wherein said driven gear further comprises at least one hub post and/or hub well on its upper and/or lower surfaces.

17. A book as defined in claim 9 wherein said driven gear comprises a gear with at least one movable hub adapted for sliding and/or rotating within a slot wherein said movable hub interlocks with a hub well formed in one of a different driven gear, a page, a power gear, or a driven member.

18. A book as defined in claim 17 wherein said driven gear further, comprises at least one hub, hub post and/or hub well on its upper and/or lower surfaces.

19. A book as defined in claim 9 wherein said driven member comprises at least one movable hub adapted for sliding or rotating within a slot wherein said movable hub interlocks with a hub well formed in one of a different driven member, a page, a power gear, or a driven gear.

20. A book as defined in claim 19 wherein said driven member further comprises at least one hub, hub post and/or hub well on its upper and/or lower surfaces.

21. A book as defined in claim 9 wherein said driven member comprises at least one movable hub adapted for rotating within a hub well or hole wherein said movable hub interlocks with a hub well formed in one of a different other driven member, a page, a power gear, or a driven gear.

22. A book as defined in claim 21 wherein said driven member further comprises at least one hub, hub post and/or hub well on its upper and/or lower surfaces.

23. A book as defined in claim 9 wherein said power gear further comprises at least one hub, hub post and/or hub well on its upper and/or lower surfaces.

24. A method for teaching the concept of power transmission with a book, said method comprising:
   (a) providing at least one page of a book with an opening;
   (b) providing said book with a gear-driving device, wherein said gear-driving device comprises a means for engaging one or more gears with at least one power shaft of at least one motor;
   (c) wherein said power shaft of said gear-driving device is aligned with said opening on said page;
   (d) providing instructions for the user of the book to engage at least one power gear with said power shaft and to engage at least one driven gear with said page; and
   (e) providing instructions for the user to create an interlocking moving gear display that relates to the subject matter of the page in use.

25. A method as defined in claim 24 wherein said book provides instruction to the user regarding the selection and placement of gears.

26. A method for teaching the concept of power transmission with a gear-driving device, said method comprising:
   (a) providing at least one page with an opening;
   (b) wherein said gear-driving device comprises a means for engaging one or more gears with at least one power shaft of at least one motor;
   (c) wherein said power shaft of said gear-driving device is aligned with said opening on said page;
   (d) providing instructions for the user of the gear-driving device to engage at least one power gear with said power shaft and to place at least one driven gear on said page; and
   (e) providing instructions for the user to create an interlocking moving gear display that relates to the subject matter of the page in use.

* * * * *